United States Patent
Cho

(10) Patent No.: US 10,399,539 B2
(45) Date of Patent: Sep. 3, 2019

(54) PRETENSIONER AND SAFETY BELT ASSEMBLY HAVING THE SAME

(71) Applicant: Hyundai Motor Company, Seoul (KR)

(72) Inventor: Sung Hun Cho, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 151 days.

(21) Appl. No.: 15/489,949

(22) Filed: Apr. 18, 2017

(65) Prior Publication Data

US 2018/0162318 A1 Jun. 14, 2018

(30) Foreign Application Priority Data

Dec. 13, 2016 (KR) .................... 10-2016-0169118

(51) Int. Cl.
*B60R 22/00* (2006.01)
*B60R 22/46* (2006.01)

(52) U.S. Cl.
CPC .. *B60R 22/4633* (2013.01); *B60R 2022/4638* (2013.01); *B60R 2022/4685* (2013.01); *B60R 2022/4695* (2013.01)

(58) Field of Classification Search
CPC .............. B60R 22/463; B60R 22/4619; B60R 2022/4638; B60R 2022/4695; B60R 2022/4685
See application file for complete search history.

(56) References Cited

U.S. PATENT DOCUMENTS

| 6,626,463 | B1 * | 9/2003 | Arima ................... B60R 21/013 280/735 |
| 7,832,768 | B2 * | 11/2010 | Singer ................. B60R 22/1952 280/806 |
| 8,011,696 | B2 * | 9/2011 | Singer ................. B60R 22/1952 280/806 |
| 2014/0374527 | A1 * | 12/2014 | Betz ..................... B60R 22/1952 242/374 |
| 2015/0028652 | A1 * | 1/2015 | Betz ..................... B60R 22/4633 297/480 |
| 2016/0368451 | A1 * | 12/2016 | Kacprzak ............ B60R 22/1952 |

* cited by examiner

*Primary Examiner* — Sang K Kim
(74) *Attorney, Agent, or Firm* — Morgan, Lewis & Bockius LLP

(57) ABSTRACT

A pretensioner and safety belt assembly may include includes a base member fixed to a vehicle, a torsion shaft having a first side and a second side rotatably supported on the base member, a torsion tube having a first end portion fixed on an external surface of the torsion shaft and a second end portion rotatably supported on the external surface of the torsion shaft wherein a belt configured to restrain an occupant is wound around an external surface of the torsion tube, a traction wire wound around an end portion of the torsion shaft on an opposite side to where the torsion tube is fixed to the torsion shaft in an opposite direction to a direction in which the belt is wound, and a pulling device configured to pull the traction wire to rotate the torsion shaft.

8 Claims, 8 Drawing Sheets

PRETENSIONER AND SAFETY BELT ASSEMBLY HAVING THE SAME

CROSS-REFERENCE(S) TO RELATED APPLICATIONS

The present application claims priority to Korean Patent Application No. 10-2016-0169118, filed on Dec. 13, 2016, the entire contents of which is incorporated herein for all purposes by this reference.

BACKGROUND OF THE INVENTION

Field of the Invention

The present invention relates to a pretensioner and safety belt assembly having the same, capable of differently adjusting the tension on a belt depending on the conditions of a collision of a vehicle and protecting the body of a passenger by keeping the tension of the belt below a limit load.

Description of Related Art

A safety belt (also referred to as seat belt) assembly is a device configured to hold a passenger firmly in his or her seat in a vehicle and designed to protect the passenger during a collision or accident that might occur during a drive.

The safety belt assembly includes a belt known as webbing, a retractor attached to the car body for winding or unwinding an end of the belt, a fixing anchor to fix the other end of the belt to the car body, and a tongue plate fastened to a buckle arranged on the opposite side of the fixing anchor while being movably stuck in the middle of the belt.

The safety belt assembly may also include a pretensioner configured to tighten any slack in the belt by applying tension on the belt by instantaneously pulling the belt at the start of a collision. The pretensioner may be of the type in which the pretensioner is integrated with the retractor, or the type in which the pretensioner is disposed on the side of the fixing anchor, or an anchor of the buckle, to pull the belt or buckle.

However, a safety belt assembly that employs a pretensioner may cause damage to the passenger when the tension on the belt increases too much due to the mechanism of the pretensioner in the beginning of an accident.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a pretensioner configured as a load limiter to keep the tension of a belt below a limit load, and a safety belt assembly having the pretensioner.

Various aspects of the present invention are also directed to provide a pretensioner and vehicle having the same, configured for differently adjusting the tension on a belt depending on the conditions of a collision of the vehicle.

In accordance with an aspect of the present invention, a pretensioner includes a base member fixed to the vehicle, a torsion shaft having both sides rotatably supported on the base member, a torsion tube having one end portion fixed on an external surface of the torsion shaft and the other end portion rotatably supported on the external surface of the torsion shaft wherein a belt configured to restrain the occupant is wound around the external surface of the torsion tube, a traction wire wound around an end portion of the torsion shaft on the opposite side to where the torsion tube is fixed to the torsion shaft in an opposite direction to the direction in which the belt is wound, and a pulling device configured to pull the traction wire therein rotating the torsion shaft.

The pulling device may include a cylinder fixed on the base member, a piston disposed inside the cylinder and connected to an end portion of the traction wire, a gas generator configured to move the piston in a direction of retracting the traction wire by supplying gas to the inside of the cylinder, and an one way confining device disposed in the piston to restrict the piston from moving backward thereof.

The pretensioner may further include a rotation limit device disposed at an end portion of the torsion shaft on the opposite side to where the traction wire is wound and configured to restrict the torsion shaft from being rotated in an unwinding direction of the belt after the gas generator is activated.

The rotation limit device may include a ratchet wheel fixed at an end portion of the torsion shaft, a pawl configured to catch and confine the ratchet wheel through forward and backward motion and restrict the ratchet wheel from rotating in the unwinding direction of the belt when the ratchet wheel is confined, a case configured to receive a portion of the pawl configured to be able to move forward and backward, and a gas supply tube configured to connect the case and the cylinder and to supply gas into the case to engage the pawl while the gas generator is activated.

The pretensioner may further include a controller configured to control operation of the gas generator by detecting a collision of a vehicle, wherein the controller may be configured to determine whether the collision is a low-speed collision or a high-speed collision based on set information, and when it is determined to be the high-speed collision activate the pulling device.

The one way confining device may include one or more inclined grooves formed on an external surface of the piston facing the internal surface of the cylinder, and having a depth which gets shallower in the direction in which the piston is moved by activation of the gas generator, and confining members received in the one or more inclined grooves.

Torsion stress of the torsion shaft may be set to be less than that of the torsion tube.

In accordance with another aspect of the present invention, a pretensioner includes a base member fixed to a vehicle, a torsion shaft with both sides rotatably supported on the base member wherein a belt is wound on an external surface of the torsion shaft configured to restrain a passenger, a traction wire wound around an end portion of the torsion shaft in an opposite direction to the direction in which the belt is wound, and a pulling device configured to pull the drawing wire therein rotating the torsion shaft.

In accordance with still another aspect of the present invention, a safety belt assembly includes a belt configured to restrain a passenger, and a pretensioner configured to apply tension by pulling an end portion of the belt, wherein the pretensioner includes a base member fixed to a vehicle, a torsion shaft having both sides rotatably supported on the base member, a torsion tube having one end portion fixed on an external surface of the torsion shaft and the other end portion rotatably supported on the external surface of the torsion shaft, wherein the belt is wound around the external surface of the torsion tube, a traction wire wound around an end portion of the torsion shaft on an opposite side to where the torsion tube is fixed to the torsion shaft in an opposite direction to the direction in which the belt is wound, and a pulling device configured to pull the traction wire therein rotating the torsion shaft.

The methods and apparatuses of the present invention have other features and advantages which will be apparent from or are set forth in more detail in the accompanying drawings, which are incorporated herein, and the following Detailed Description, which together are configured to explain certain principles of the present invention.

Figure 1:
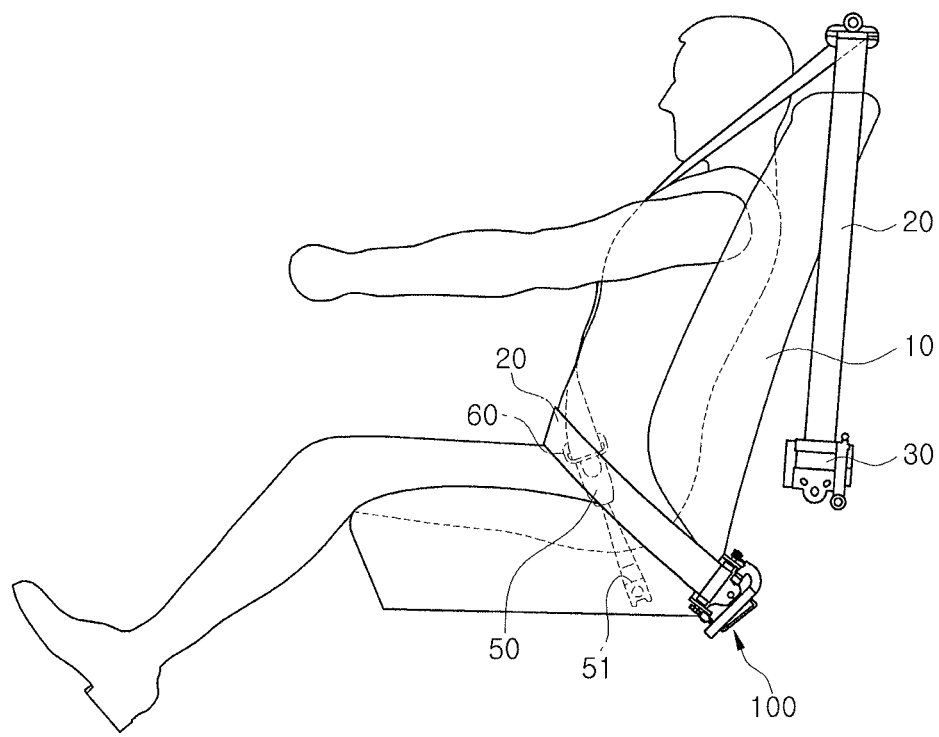
FIG. 1 shows a safety belt assembly with a pretensioner, according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 shows a safety belt assembly with a pretensioner, according to an exemplary embodiment of the present invention. Referring to FIG. 1, the safety belt assembly may include a belt 20 for firmly holding a passenger seated in seat 10, a retractor 30 attached to the vehicle for winding or unwinding one end portion of the belt 20, a pretensioner 100 for fixing the other end portion of the belt 20 and applying tension by pulling the belt 20 in the instance of an accident, and a tongue plate 60 fastened to a buckle 50 disposed on an opposite side to the pretensioner 100 while being stuck in the middle of the belt 20.

The safety belt assembly may increase tension of the belt 20 by instantaneously pulling the belt 20 around the belly of the passenger through operation of the pretensioner 100 at the start of a collision. Accordingly, the safety belt assembly may prevent the belt 20 from being loosened in the beginning of a collision, stably holding the passenger firmly in the seat 10.

Although FIG. 1 shows the pretensioner 100 disposed on a fixed end portion of the belt 20, it is also possible for the pretensioner 100 to replace fixer 51 of the buckle 50 on the opposite side. In the present case, the pretensioner 100 may tighten up slack in the belt 20 by applying tension onto the belt 20 in such a way as to tighten the buckle 50 in the event of a collision.

The pretensioner 100 may not only be configured to apply the tension by pulling the belt 20 at the start of an accident, but also be configured as a load limiter for keeping the tension of the belt 20 below a limit load when the tension of the belt 20 increases rapidly, protecting the body of a passenger. Pretensioner 100 may also adjust the tension on the belt 20 differently depending on the conditions of the collision of a vehicle. The structure and operation of the pretensioner 100 will now be described in detail.

Figure 2:
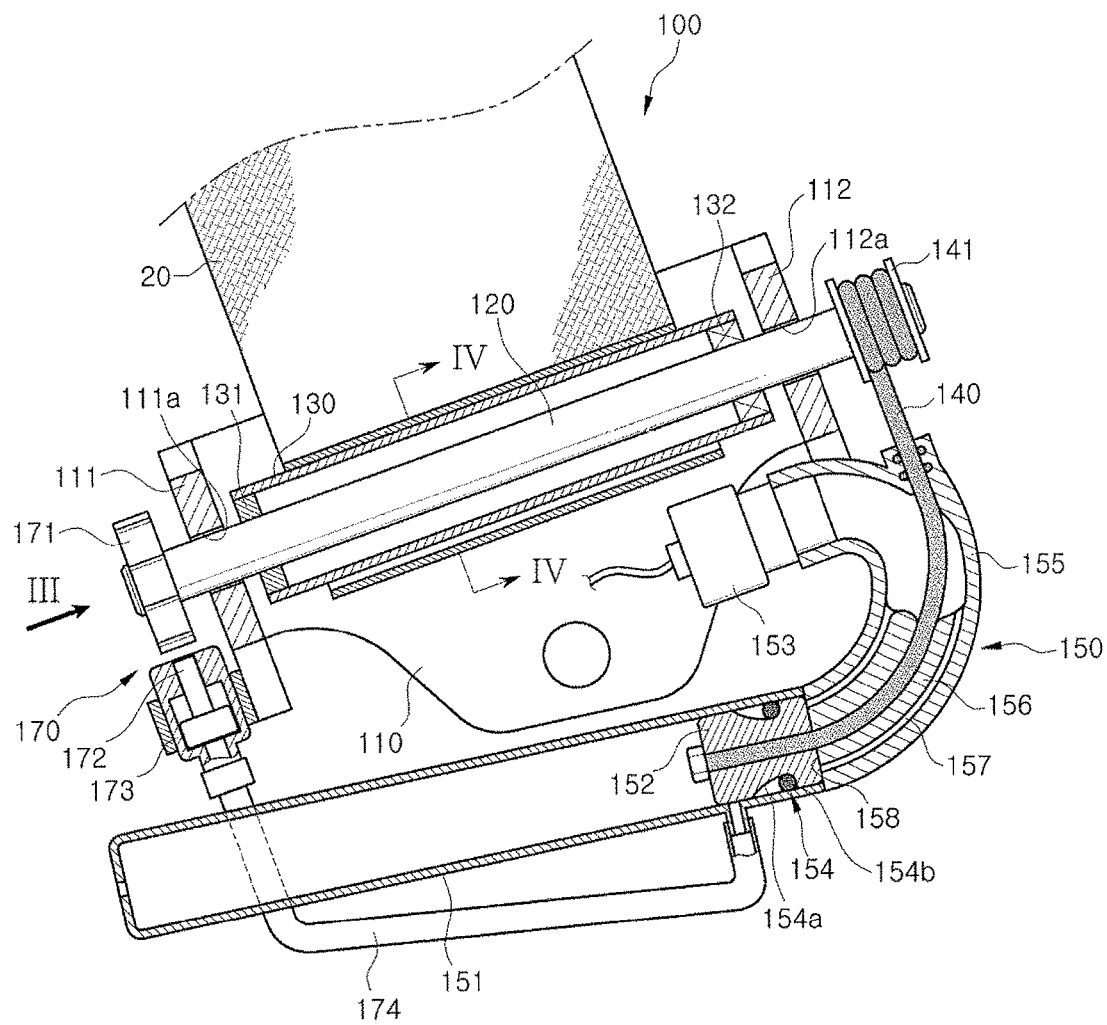
FIG. 2 is a structure of a pretensioner, according to an exemplary embodiment of the present invention.
Figure 3:
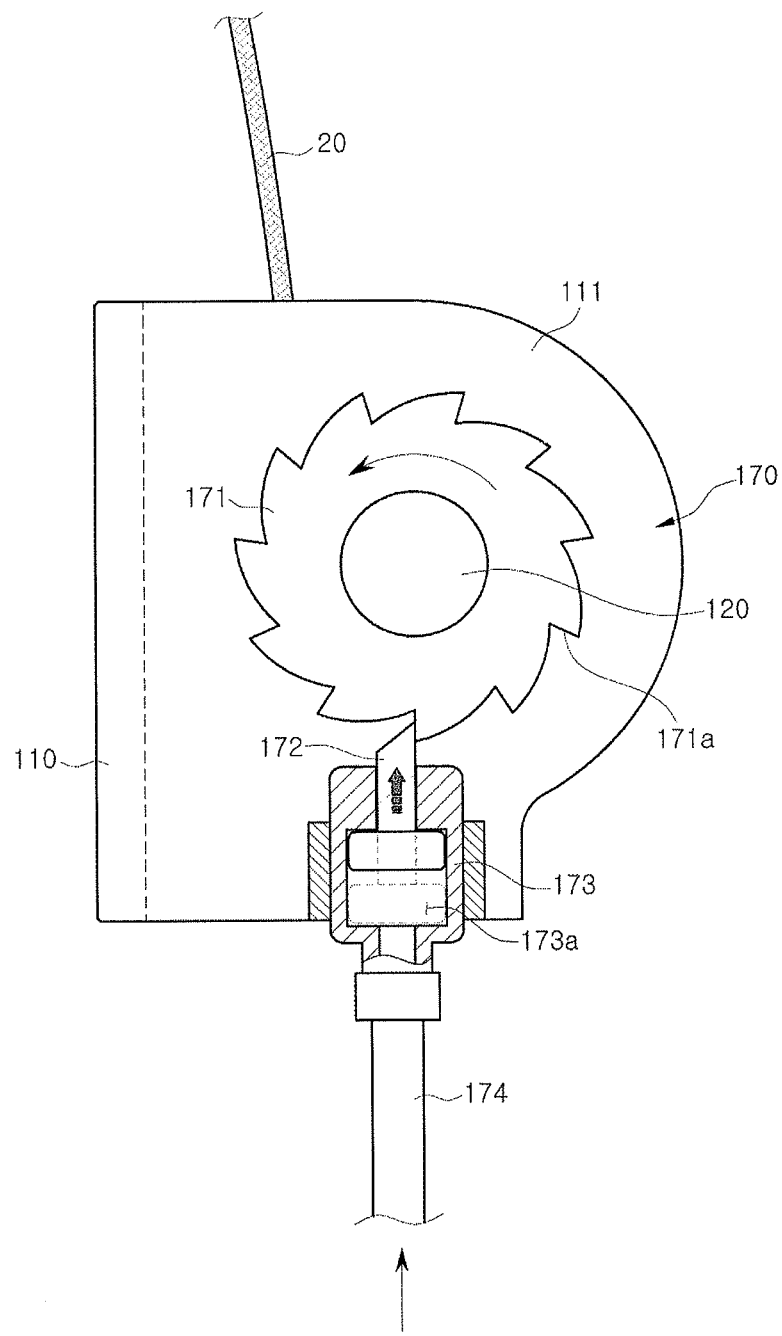
FIG. 3 is a side view of the pretensioner, viewed from a direction of arrow III of FIG. 2.

FIG. 2 is a depiction of the structure of a pretensioner according to an exemplary embodiment of the present invention. FIG. 3 is a side view of the pretensioner, viewed from the direction of arrow III of FIG. 2, and FIG. 4 is a cross-sectional view of the pretensioner cut along line IV-IV of FIG. 2.

Figure 4:
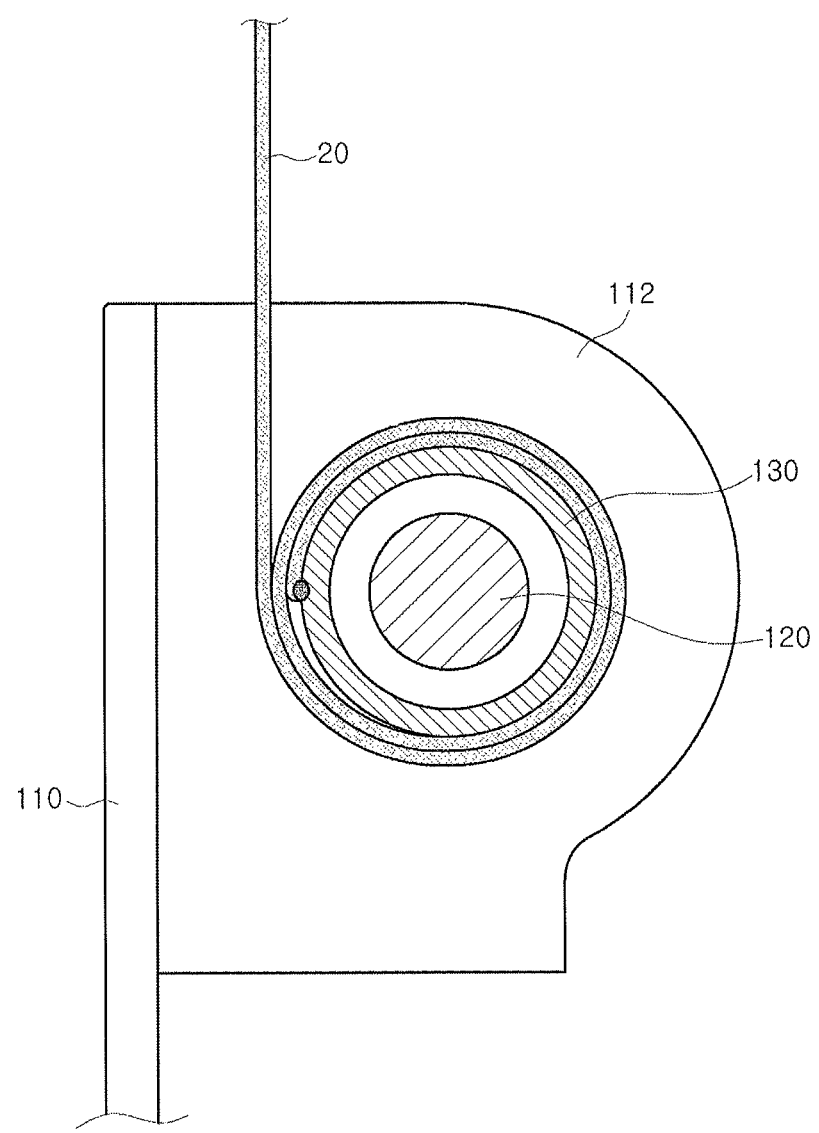
FIG. 4 is a cross-sectional view of the pretensioner cut along line IV-IV of FIG. 2.

Referring to FIG. 2 to FIG. 4, the pretensioner 100 may include a base member 110 fixed to the vehicle, a torsion shaft 120 rotatably supported on the base member 110, a torsion tube 130 disposed on the outside of the torsion shaft 120 and having the external face wound by the belt 20, a traction wire 140 wound around an end portion of the torsion shaft 120, a pulling device 150 configured for retracting the traction wire 140 for rotation of the torsion shaft 120, and a rotation limit device 170 disposed at an end portion of the torsion shaft 120 on the opposite side to where the traction wire 140 is wound.

The base member 110 may be formed of steel and fixed on the vehicle body e.g., by fastening bolts. The base member 110 includes shaft supporters 111 and 112 on both sides to rotatably support both end portions of the torsion shaft 120.

The torsion shaft 120 is formed to be longer than the distance between the two shaft supporters 111 and 112 of the base member 110, and rotatably supported on shaft supporting balls 111*a* and 112*a* of the shaft supporters 111 and 112 in such a form that both end portions of the torsion shaft 120 each protrude outward from the shaft supporters 111 and 112.

The torsion tube 130 is formed to be shorter than the distance between the two shaft supporters 111 and 112 of the base member 110, and disposed outside of the torsion shaft 120 between the two shaft supporters 111 and 112. On the external surface of the torsion tube 130, as shown in FIG. 4, the belt 20 is wound several times, and an end portion of the belt 20 is fixed to the torsion tube 130.

As shown in FIG. 2, the torsion tube 130 has one end portion fixed to the external surface of the torsion shaft 120 via a fixing member 131, and the other end portion rotatably supported on the external surface of the torsion shaft 120 by a bearing 132. The fixing member 131 may be fixed onto an end portion of the torsion tube 130 and the external surface of the torsion shaft 120 by e.g., welding. Accordingly, when the belt 20 is pulled while the torsion shaft 120 is fixed the torsion tube 130 may be twisted causing a certain section of the belt 20 to be drawn out.

The traction wire 140 is wound around an end portion of the torsion shaft 120 on the opposite side to a fixed position of the torsion tube 130, i.e., to the fixed member 131, in an opposite direction to the direction in which the belt 20 is wound. A bobbin 141 for winding the traction wire 140 may be disposed at an end portion of the torsion shaft 120. The traction wire 140 has one end portion fixed to and wound around the bobbin 141 several times and the other end portion connected to the pulling device 150. Accordingly, when the pulling device 150 pulls the traction wire 140, the torsion tube 130 may be rotated along with the torsion shaft 120, and the belt 20 may be pulled while being wound on the external surface of the torsion tube 130.

The pulling device 150 may include a cylinder 151 fixed to the based member 110, a piston 152 disposed and configured to move forwards and backwards in cylinder 151 and connected to an end portion of the traction wire 140, a gas generator 153 for supplying gas into cylinder 151 to move the piston 152 in the direction of pulling the traction wire 140, and a one way confining device 154 disposed in the piston 152 to restrict the backward movement of piston 152.

Cylinder 151 may include a bending part 155 on the side where the traction wire 140 enters, and the gas generator 153 may be disposed at an end portion of the bending part 155 to supply gas toward the piston 152 in cylinder 151. The traction wire 140 enters to the internal side of the bending part 155 and connects to the piston 152 while being supported by a curved wire supporter 156. Accordingly, the gas supplied by the gas generator 153 may move the piston 152, which may in turn pull the traction wire 140 causing the torsion shaft 120 to rotate. Reference number 157 in FIG. 2 denotes a plurality of gas passages formed in the bending part 155.

Although the cylinder 151 has the bending part 155 in the present embodiment, the shape or disposition direction of the cylinder 151 is not limited thereto. The cylinder 151 may have the form of a straight line, and may be disposed in parallel with the direction in which the traction wire 140 is drawn. Although not shown, a roller may be disposed on one side of the cylinder 151 to draw the traction wire 140 smoothly.

The one way confining device 154 may include one or more inclined grooves 154a formed on the external surface of the piston 152 facing the internal surface of the cylinder 151 and having a depth gradient which is narrower in the direction in which the piston 152 is moved when the traction wire 140 is drawn, and confining members 154b shaped like a ball or roller disposed in the one or more inclined grooves 154a.

Figure 7:
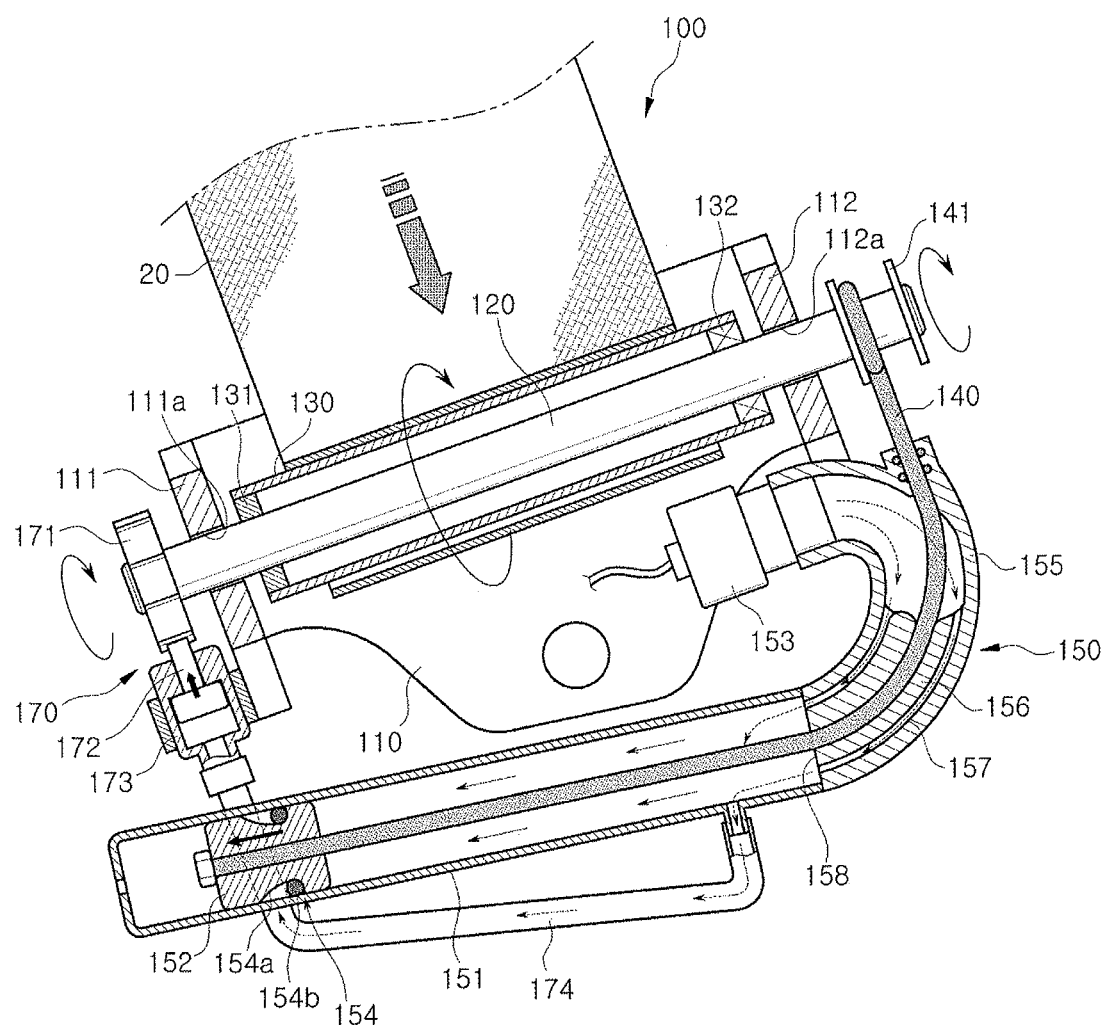
FIG. 7 and FIG. 8 show a mechanism of a pretensioner in a high-speed collision, according to an exemplary embodiment of the present invention.

The one way confining device 154 allows the piston 152 to move against the cylinder 151 because the confining members 154b are located in a relatively wide section in the inclined grooves 154a when the piston 152 is moved in a direction of pulling the traction wire 140, as shown in FIG. 7.

Figure 8:
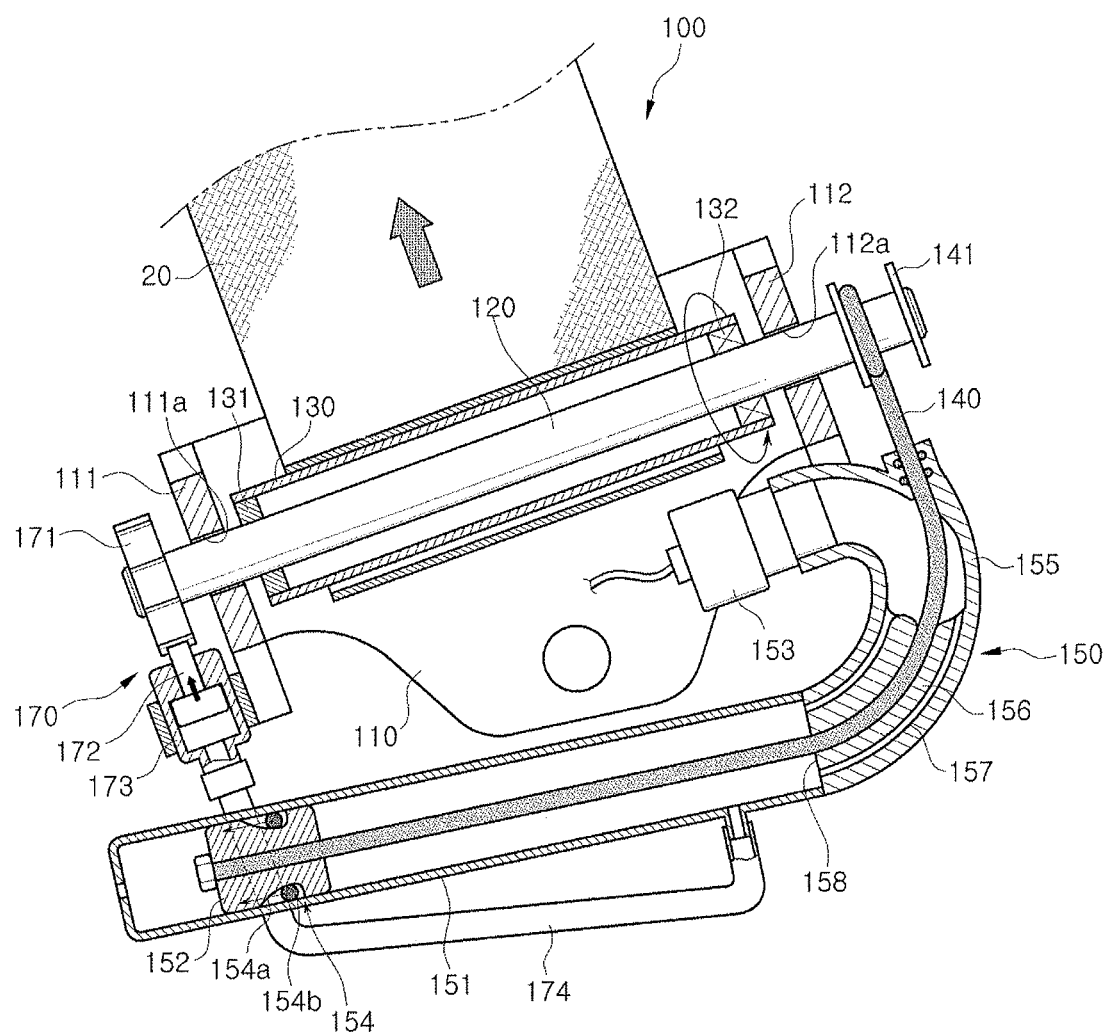

However, as shown in FIG. 8, when the piston 152 is to move in the backward direction, the confining members 154b are moved to relatively narrow section in the inclined grooves 154a and stuck between the piston 152 and an internal wall of the cylinder 151, making the piston 152 confined in the cylinder 151. That is, confining device 154 restricts backward movement of the piston 152.

Referring to FIG. 2, in the initial state the piston 152 is located on the side of the bending part 155 close to the gas generator 153 and movement toward the bending part 155 is restricted by being caught by a catching projection 158 inside the cylinder 151. Furthermore, since the traction wire 140 wound around the torsion shaft 120 is connected to the piston 152 while keeping a certain tension in the initial state, the torsion shaft 120 is restricted from rotating in an unwinding direction of the belt 20. Accordingly, in the initial state, the end portion of the torsion shaft 120 around which the traction wire 140 is wound remains fixed.

Figure 6:
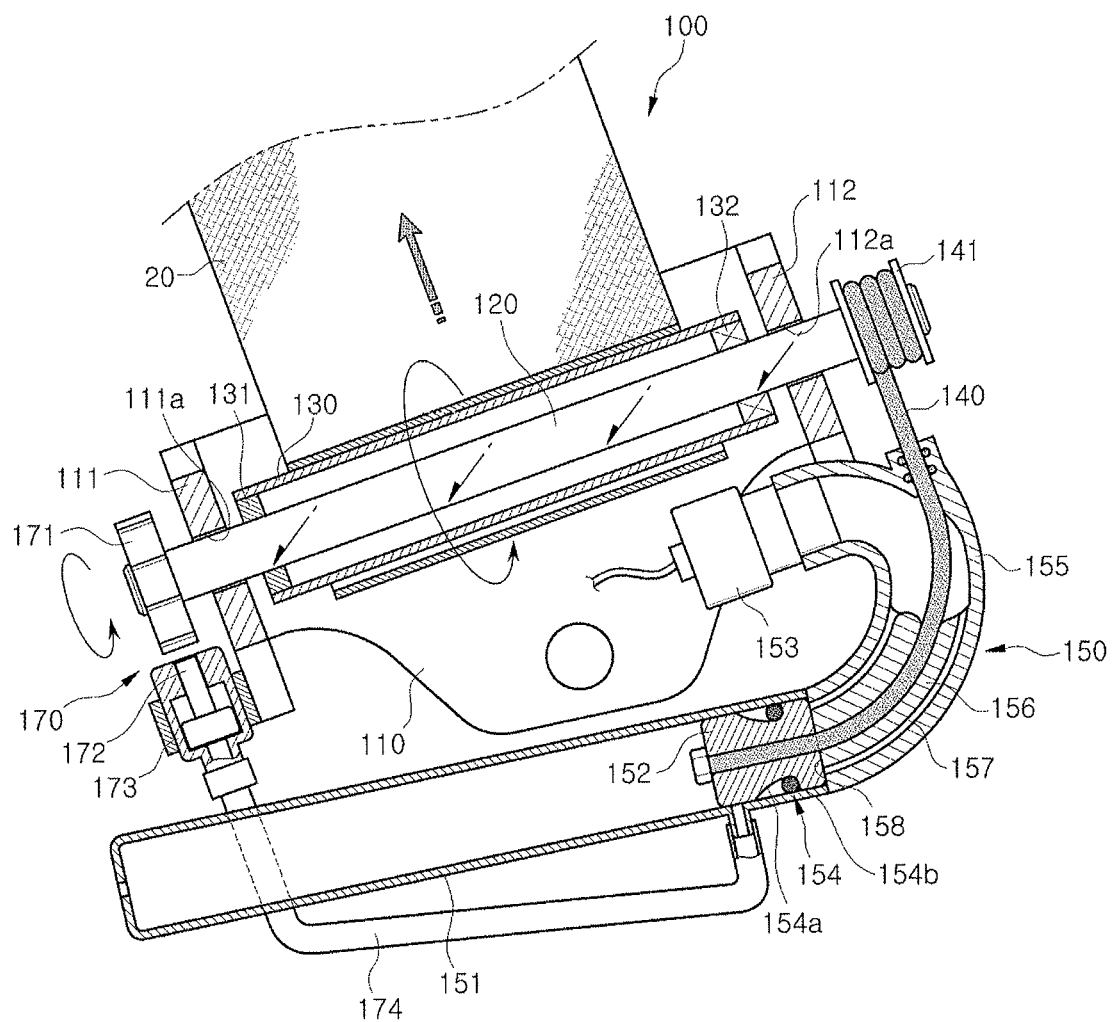
FIG. 6 shows a mechanism of a pretensioner in a low-speed collision, according to an exemplary embodiment of the present invention.

In the initial state, the other end portion of the torsion shaft 120 on the opposite side to the traction wire 140 is rotatable. Accordingly, when the torsion tube 130 is rotated by the tension of the belt 20, the torsion shaft 120 may be twisted, allowing a certain section of belt 20 to be unwound, as shown in FIG. 6. For the present mechanism, the torsion stress of the torsion shaft 120 may be set to be less than that of the torsion tube 130.

Referring to FIG. 2 and FIG. 3, the rotation limit device 170 may include a ratchet wheel 171 fixed at the end portion of the torsion shaft 120 on the opposite side to where the traction wire 140 is wound, a pawl 172 configured to catch and confine the ratchet wheel 171 through forward and backward motion and restricting the rotation of the ratchet wheel 171 in the unwinding direction of the belt 20, a case 173 having a closed compartment 173a for receiving a portion of the pawl 172 to be able to move forward and backward, and a gas supply tube 174 connecting the case 173 and the cylinder 151.

The ratchet wheel 171 is restricted from rotating clockwise (the unwinding direction of the belt) despite the tension of the belt 20 when the pawl 172 goes up and is caught by a tooth 171a formed on the edge portion of the ratchet wheel 171, as shown in FIG. 3. On the contrary, as shown in FIG. 7, while the torsion shaft 120 is rotated in the winding direction of the belt 20 as the traction wire 140 is pulled by operation of the gas generator 150, the ratchet wheel 171 may be rotated along with the torsion shaft 120. The ratchet wheel 171 may have the belt 20 wound around the torsion tube 130 and pulled accordingly. In other words, the ratchet wheel 171 may be rotated in the winding direction of the belt 20 even while the pawl 172 is in the state of going up due to the pressure of the gas supplied into the case 173 through the gas supply tube 174.

Figure 5:
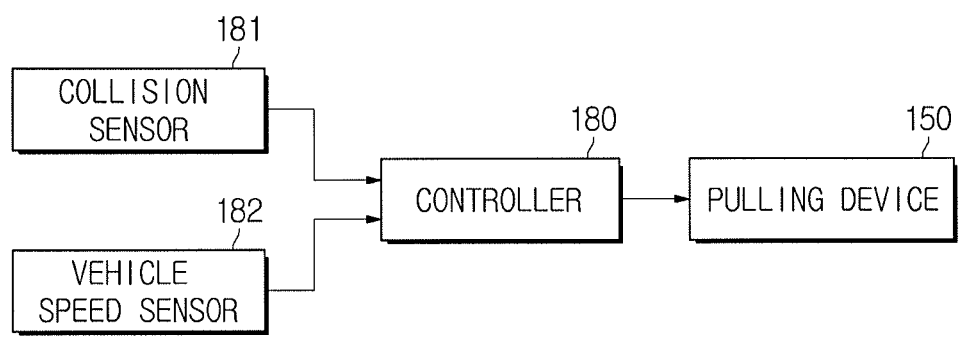
FIG. 5 is a block diagram for the controlling operation of a pretensioner, according to an exemplary embodiment of the present invention.

FIG. 5 is a block diagram for controlling the operation of a pretensioner according to an exemplary embodiment of the present invention. Referring to FIG. 5, a controller 180 may detect whether the vehicle has a collision based on information from a collision sensor 181 and vehicle speed sensor 182 disposed in the vehicle. The controller 180 may determine whether the collision of the vehicle is a low-speed collision or high-speed collision by comparing the actual vehicle speed and predetermined vehicle speed information. When it is determined that the vehicle has a high-speed collision, the controller 180 ignites the gas generator 153 to operate the pulling device 150. When it is determined that the vehicle has the low-speed collision, the controller 180 does not operate the pulling device 150.

Next, the operation of a pretensioner in accordance with an exemplary embodiment of the present invention will now be described in connection with FIG. 6 to FIG. 8. FIG. 6 shows a mechanism of a pretensioner in a low-speed collision according to an exemplary embodiment of the present invention, and FIG. 7 and FIG. 8 show a mechanism of a pretensioner in a high-speed collision according to an exemplary embodiment of the present invention.

When the vehicle has a low-speed collision the pulling device 150 is not activated, as shown in FIG. 6. In the present case, the torsion shaft 120 has one end portion around which the traction wire 140 is wound remains fixed and the other end portion put in a rotatable state. Accordingly, when the torsion tube 130 is rotated by the tension on the belt 20, the torsion shaft 120 may be twisted, allowing a certain section of belt 20 to be unwound. The present case may reduce the force applied to the torso of the passenger, preventing damage to the torso of the passenger.

When the vehicle has a high-speed collision, the gas generator 153 ignites as directed by controller 180, activating the pulling device 150 as shown in FIG. 7. In the present case, the piston 152 in the cylinder 151 is moved by the pressure of the gas, pulling the traction wire 140 and rotating the torsion shaft 120 in the winding direction of the belt 20 while the traction wire 140 wound around the torsion shaft 120 is unwound.

As the torsion tube 130 is also rotated once the torsion shaft 120 is rotated by activation of the pulling device 150, the belt 20 is wound on the external surface of the torsion tube 130, increasing the tension on the belt 20 at the start of a collision. In the present case that the pulling device 150 is activated, the gas inside the cylinder 151 is supplied into the case 173 of the rotation limit device 170 through the gas supply tube 174, making the pawl 172 confine the ratchet wheel 171 to restrict the ratchet wheel 171 from being rotated in a direction. Specifically, the rotation limit device 170 allows the torsion shaft 120 to be rotated only in the winding direction of the belt 20 while restricting the rotation in the opposite direction.

In the case of a high-speed collision the torsion shaft 120 and torsion tube 130 are rotated in the winding direction of the belt 20 by the activation of the pulling device 150, tightening up the belt and holding the passenger firmly in the seat 10, as shown in FIG. 7.

Meanwhile, in the case of high-speed collision, when the tension on the belt 20 increases more than a limit load, the torsion shaft 120 is restricted from being rotated in the unwinding direction of the belt 20 by the traction wire 140 at one end portion and the rotation limit device 170 at the other end portion, as shown in FIG. 8. The present case may lead to the torsion tube 130 being twisted and a certain section of the belt 20 being unwound. In other words, when the tension of the belt 20 increases more than the torsion stress of the torsion tube 130, the torsion tube 130 may be twisted and allow the belt 20 to be unwound to keep a load applied to the belt 20 below the limit load, protecting the passenger.

As described above, the pretensioner 100 in accordance with embodiments of the present invention may keep the tension of the belt 20 at a force equal to the torsion stress of the torsion shaft 120 in a low-speed collision, and keep the tension of the belt 20 at a force equal to the torsion stress of the torsion tube 130 in a high-speed collision. In other words, since the torsion stress of the torsion tube 130 is greater than that of the torsion shaft 120, the tension of the belt 20 may be kept higher in the high-speed collision than that in the low-speed collision.

While the present embodiment suggests that the rotation limit device 170 restricts the torsion shaft 120 from being rotated in a direction such that the torsion stress of the torsion tube 130 acts as the tension of the belt 20 in a high-speed collision in the aforementioned embodiment, it is possible to exclude the rotation limit device 170 in other embodiments. In the present regard, in both cases of the high-speed collision and low-speed collision, the tension of the belt 20 may be kept at the torsion stress of the torsion shaft 120.

According to various embodiments of the present invention, a pretensioner may be configured as a load limiter for keeping the tension of a belt below a limit load; when the tension of the belt increases due to a collision, a torsion shaft (or a torsion tube) is twisted and the belt is drawn out in an unwinding direction.

Furthermore, the pretensioner according to various embodiments of the present invention may be operated wherein the torsion stress of the torsion shaft acts as the tension of the belt because a draw gear is not activated in a low-speed collision and the torsion stress of the torsion tube having relatively big torsion stress acts as tension of the belt because the pulling device is activated in a high-speed collision. That is, tension on the belt may be differently adjusted depending on the conditions of collision of the vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pretensioner comprising:
 a base member fixed to a vehicle;
 a torsion shaft having a first side and a second side rotatably supported on the base member;
 a torsion tube having a first end portion fixed on an external surface of the torsion shaft and a second end portion rotatably supported on the external surface of the torsion shaft, wherein
 a belt configured to restrain an occupant is wound around an external surface of the torsion tube;
 a traction wire wound around an end portion of the torsion shaft on an opposite side to where the torsion tube is fixed to the torsion shaft in an opposite direction to a direction in which the belt is wound; and
 a pulling device configured to pull the traction wire to rotate the torsion shaft.

2. The pretensioner of claim 1, wherein the pulling device comprises:
 a cylinder fixed on the base member;
 a piston disposed in the cylinder and connected to an end portion of the traction wire;
 a gas generator configured to move the piston in a direction of retracting the traction wire by supplying gas to an inside of the cylinder; and an one way confining device disposed in the piston to restrict the piston from moving backward thereof.

3. The pretensioner of claim 2, further comprising:
a rotation limit device disposed at the end portion of the torsion shaft on the opposite side to where the traction wire is wound and configured to restrict the torsion shaft from being rotated in an unwinding direction of the belt after the gas generator is activated.

4. The pretensioner of claim 3, wherein the rotation limit device comprises
a ratchet wheel fixed at an end portion of the torsion shaft;
a pawl configured to catch and confine the ratchet wheel through forward and backward motion thereof, and restrict the ratchet wheel from being rotated in the unwinding direction of the belt at a time of the ratchet wheel being confined;
a case configured to receive a portion of the pawl to be configured to move forward and backward thereof; and
a gas supply tube configured to connect the case and the cylinder to supply gas into the case to activate the pawl while the gas generator is activated.

5. The pretensioner of claim 2, wherein a first the one way confining device includes:
at least one inclined groove formed on an external surface of the piston facing an internal surface of the cylinder and having a depth getting shallower in a direction in which the piston is configured to be moved by activation of the gas generator; and
confining members received in the at least one inclined groove.

6. The pretensioner of claim 1, further comprising:
a controller configured to control operation of the gas generator by detecting a collision of the vehicle,
wherein the controller is configured to determine whether the collision is a low-speed collision or a high-speed collision based on set information, and when it is configured to be determined to be the high-speed collision, configured to activate the pulling device.

7. The pretensioner of claim 1, wherein torsion stress of the torsion shaft is set to be less than that of the torsion tube.

8. A safety belt assembly comprising:
a belt configured to restraining a passenger, and a pretensioner configured to apply tension by pulling an end portion of the belt,
wherein the pretensioner includes:
a base member fixed to a vehicle;
a torsion shaft having a first side and a second side rotatably supported on the base member;
a torsion tube having a first end portion fixed on an external surface of the torsion shaft and a second end portion rotatably supported on the external surface of the torsion shaft, wherein the belt is wound around an external surface of the torsion tube;
a traction wire wound around an end portion of the torsion shaft on an opposite side to where the torsion tube is fixed to the torsion shaft in an opposite direction to a direction in which the belt is wound; and
a pulling device configured to pull the traction wire to rotate the torsion shaft.

* * * * *